(12) United States Patent
Hosoda (10) Patent No.: US 6,182,779 B1
(45) Date of Patent: Feb. 6, 2001

(54) POWER TRANSMISSION DEVICE AND TRANSPORTATION DEVICE

(76) Inventor: Kiyoyuki Hosoda, 733-3, Ohaza Meisei, Misato-mura, Minamiazumi-gun, Nagano, 399-8101 (JP)

( * ) Notice: Under 35 U.S.C. 154(b), the term of this patent shall be extended for 0 days.

(21) Appl. No.: 09/059,400

(22) Filed: Apr. 14, 1998

(30) Foreign Application Priority Data

Aug. 28, 1997 (JP) .................................................. 9-232240

(51) Int. Cl.$^7$ .................................................. A63C 17/12
(52) U.S. Cl. .................. 180/180; 180/181; 180/267; 280/87.042
(58) Field of Search .................. 180/180, 181, 180/213, 76, 244, 266, 267; 280/87.042

(56) References Cited

U.S. PATENT DOCUMENTS

| | | | | |
|---|---|---|---|---|
| 1,012,847 | * | 12/1911 | Hatfield et al. ........................ | 180/76 |
| 1,491,263 | * | 4/1924 | Hendricks .............................. | 180/76 |
| 2,857,008 | * | 10/1958 | Pirrello ................................. | 180/181 |
| 3,232,369 | * | 2/1966 | Holloway .............................. | 180/76 |
| 4,151,892 | * | 5/1979 | Francken .............................. | 180/181 |
| 4,180,138 | * | 12/1979 | Shea ..................................... | 180/76 |
| 4,681,180 | * | 7/1987 | Oyama et al. ......................... | 180/76 |
| 5,048,632 | * | 9/1991 | Battel ................................... | 180/181 |
| 5,269,399 | * | 12/1993 | Ito et al. ............................... | 180/76 |
| 5,353,889 | * | 10/1994 | Hamada ................................ | 180/76 |
| 5,487,441 | * | 1/1996 | Endo et al. ........................... | 180/181 |
| 5,819,865 | * | 10/1998 | Cowley ................................. | 180/181 |

FOREIGN PATENT DOCUMENTS

| | | | | |
|---|---|---|---|---|
| 628481 | * | 10/1927 | (FR) ..................................... | 180/76 |
| 6-23087 | | 2/1994 | (JP) . | |

* cited by examiner

Primary Examiner—Daniel G. DePumpo
(74) Attorney, Agent, or Firm—Burns, Doane, Swecker & Mathis, L.L.P.

(57) ABSTRACT

A power transmission device having at least two one-way clutches is used to transmit the driving force of the power generator to the right and left drive wheels. By this power transmission device, it is possible to transmit the driving force of the power generator to the right and left drive wheels almost half and half when the wheel contact load are the same. While if the drive wheels rotate at a different speed, hardly any driving force is transmitted to the side of the drive wheel which can rotate faster and the driving force is mainly transmitted to the wheel rotates slowly. Accordingly, it is possible to transmit the power without fail to the drive wheel which touches the ground even when the transportation device is curving or slipping, or when one of the wheels parts from the ground.

7 Claims, 5 Drawing Sheets

POWER TRANSMISSION DEVICE AND TRANSPORTATION DEVICE

BACKGROUND OF THE INVENTION

1. Field of the Invention

This invention relates to a power transmission device which transmits the driving force of a power generator (engine), such as an internal combustion engine and an electric motor, to right and left drive wheels, and relates to a transportation device employing this power transmission device.

2. Description of the Related Art

In a skateboard, a rider can stand on it and can run in a desired direction by putting his or her feet on the board supported by rollers and keeping his or her balance.

Simple transportation devices are being developed and they are utilized as personal transportation means, sport apparatus and leisure equipment. For example, a skateboard with a power generator such as an engine under development is able to run itself easily even on a flat surface. Such devices are still further being developed for improving the turning performance so as to rendering the device easy to control and providing the devices with enough driving capability to qualify as sport apparatus or leisure equipment. Also, some devices are being developed for improving the driving performance so that the devices may run on a rough wasteland as well as on a flat plane.

A differential gear is a common power transmitting device to transmit a driving force generated by an engine to right and left drive wheels and that can absorb the difference in rotation speed of these drive wheels at a turning due to the difference in the number of revolutions between inside and outside wheels. In a transportation device like the skateboard with an engine as described above, if the rider shifts its weight to turn, one of the drive wheels parts from the ground and runs idle. Therefore, if the differential gear is applied in such transportation device, it is impossible to obtain a stable driving force. Also, on a wasteland, one of the drive wheels likely leaves the ground or slips, thus it is impossible to obtain the desired driving force by the differential gear. It is desirable that stable driving capacity be obtained under a variety of conditions such as running on a rough place to enjoy sports, leisure, and the like. In addition, it is important for the user to be able to control the direction easily.

Although it is possible to attach a differential-limiting device to deal with the above problems, the power transmission device becomes large and expensive, which causes the transportation device to be heavy and expensive.

Therefore, an object of this invention is to provide a simple power transmission device having a function of absorbing the difference in the number of revolutions between the inside and outside wheels, and a function transmitting the driving force to the right and left wheels more continuously so as to transmit the stable driving force even when the transportation device inclines while running in a wasteland or curving. Another object of this invention is to provide a power transmission device appropriate for the aforementioned transportation device, which is lightweight, can be provided at a low cost, and has an excellent power transmission property, and to provide a transportation device which, by employing this power transmission device, has high steering performance and driving performance, and which can run in a rough place or a wasteland.

SUMMARY OF THE INVENTION

In this invention, the driving force generated by the power generator is transmitted to the right and left drive wheels through at least two separate one-way clutches. Therefore the right and left drive wheels are driven by a power transmitted via a separate one-way clutch respectively. That is, the power transmission device according to this invention has at least two one-way clutches that can each transmit the driving force generated by the power generator to the right and left drive wheels. Because the power is transmitted to the drive wheels through the one-way clutches, it is possible to transmit the driving force of the front direction to the drive wheels without slip by setting the direction of the one-way clutches. Accordingly, if the condition of ground contact and the like of the right and left drive wheels are the same, it is possible to transmit the driving force of the power generator to each of the drive wheels almost half and half.

When the user turns the transportation device having these drive wheels, or when the transportation device runs on a rough road, the right and left drive wheels rotate at a different speed each other. In this case, by the power transmission device of this invention, the driving force is mainly transmitted to the drive wheel that rotates more slowly than the other through the one-way clutch. That is, the drive wheel which comes outside during the curves, the drive wheel which parts from the ground, and the drive wheel which contact load is decreased, becomes free from driving force. This is because the free traveling side of the one-way clutch connected to the above mentioned drive wheel can rotate faster than the driving side of the one way clutch connected to the power generator and the driving side of the other one way clutch. Accordingly, hardly any driving force is transmitted to the drive wheel rotating relatively faster, while most of the driving force is supplied to the other drive wheel rotating more slowly. Therefore by employing the power transmission device according to this invention, it is possible to supply the power to the drive wheels without fail while the inside and outside wheel rotating at a different speed when the transportation device curves. Thus it is possible to obtain the stable and/or continuous driving force in whichever direction the user turns the transportation device without lowering the turning (steering) performance of the transportation device.

In addition, in the power transmission device according to this invention, most of the power is transmitted to the drive wheel which rotates slowly. When the ground contacting worsens and one of the drive wheels parts from the ground and becomes run idle, the power is mostly transmitted to the other drive wheel which touches on the ground. Thus it is possible to obtain the stable and/or continuous driving force even if the wheel contact load of one of the drive wheels is small. And since the drive power dose not transmitted to the wheel with small contact load, such a wheel does not rotate at a over speed and also the engine dose not run over with no load.

As is clear from the above description, the power transmission device according to this invention has an excellent property that can automatically adjust the power supply to the drive wheels depending on the ground contacting of the drive wheels. Furthermore, it is possible to realize this excellent property of this power transmission device by a simple arrangement having a plurality of one-way clutches which transmit the power to the right and left drive wheels respectively. As a result, this power transmission device can be configured small and lightweight, and can be provided at a low cost. And because this power transmission device has a simple configuration, it becomes a highly reliable as a mechanism.

If the power transmission device according to this invention is employed, the drive wheels on both sides are joined to the power generator such as a gasoline engine or a motor through the one-way clutches. When the transportation device having this power transmission device runs down a slope or is drawn, the drive wheels become independent of the power generator and become free owing to the one-way clutches. Thus it is possible to run the transportation device depending on the running conditions independently of the power generator.

It is preferable that a transportation device such as a vehicle that employs the power transmission device has a brake device that controls the speed of the running vehicle. But if each wheel is provided with a brake, the structure of the surroundings of the wheels becomes complicated, the transportation device becomes heavy, and the cost of manufacturing increases. In the power transmission device according to this invention, as the wheel side (traveling side) of the one-way clutches rotates with the drive wheels, it is possible to provide a brake device on the wheel side. By arranging a brake device on the power transmission device, complicated mechanisms can be placed in one place, and the structure of the surroundings of the wheels can be simplified; thus the transportation device as a whole becomes lightweight. Because the brake device can be placed close to the engine (including an electric motor and the like), it is possible to simplify the control mechanism by placing them in one place.

This power transmission device can be used in a variety of transportation devices having right and left drive wheels. It can also be employed in a transportation device having a number of drive wheels such as the four-wheel drive as well as in the two-wheel drive. The power transmission device of this invention can be applied to a simple transportation device having a power generator, a frame on which a rider can ride, and a plurality of wheels which support this frame. By the power transmission device of this invention, the driving force generated by the power generator can be transmitted to the right and left drive wheels almost half and half when the transportation device runs straight. Even when the transportation device turns and the drive wheels rotate at a different speed, the difference in the number of revolutions can be absorbed by the power transmission device, and the power is transmitted mostly to the inside drive wheel. Thus it is possible to obtain the stable and continuous driving force. And as was described above, even when the rider shifts the weight inside in turning or steering the transportation device and the wheel contact load of the outside drive wheel decreases, the stable driving force can be obtained. Also, when one of the drive wheels parts from the ground in a wasteland and the like, the driving force can be obtained continuously.

DESCRIPTION OF THE PREFERRED EMBODIMENT

Figure 1:
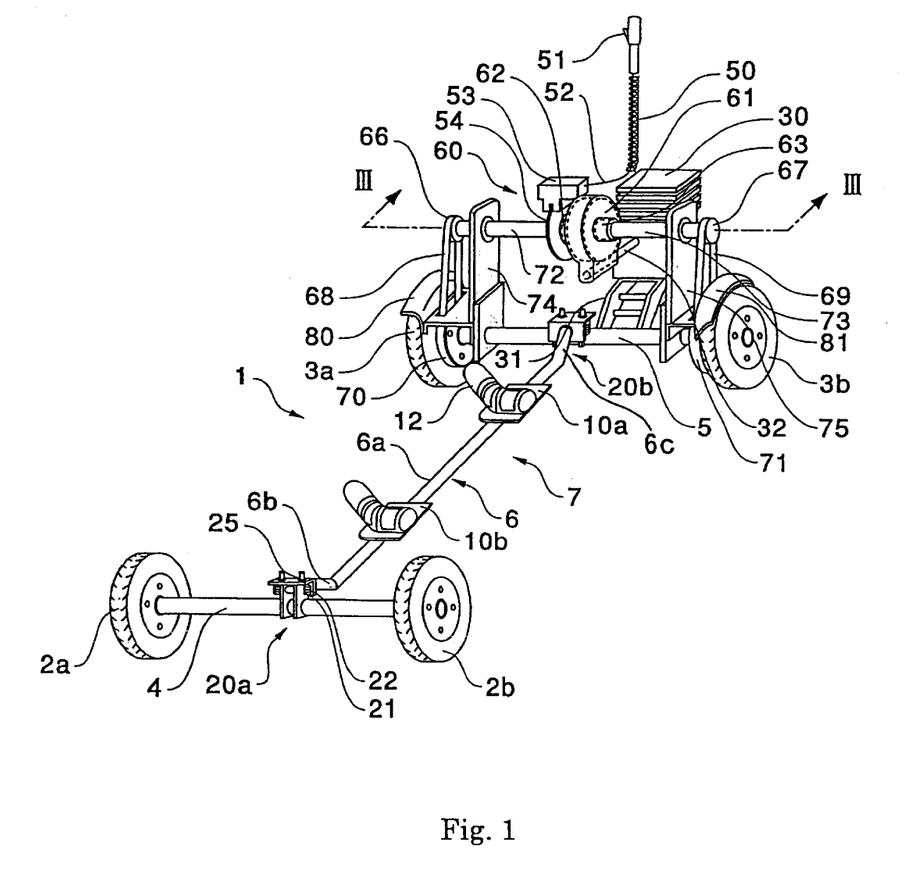
FIG. 1 is a perspective view of the transportation device according to this invention.
Figure 2:
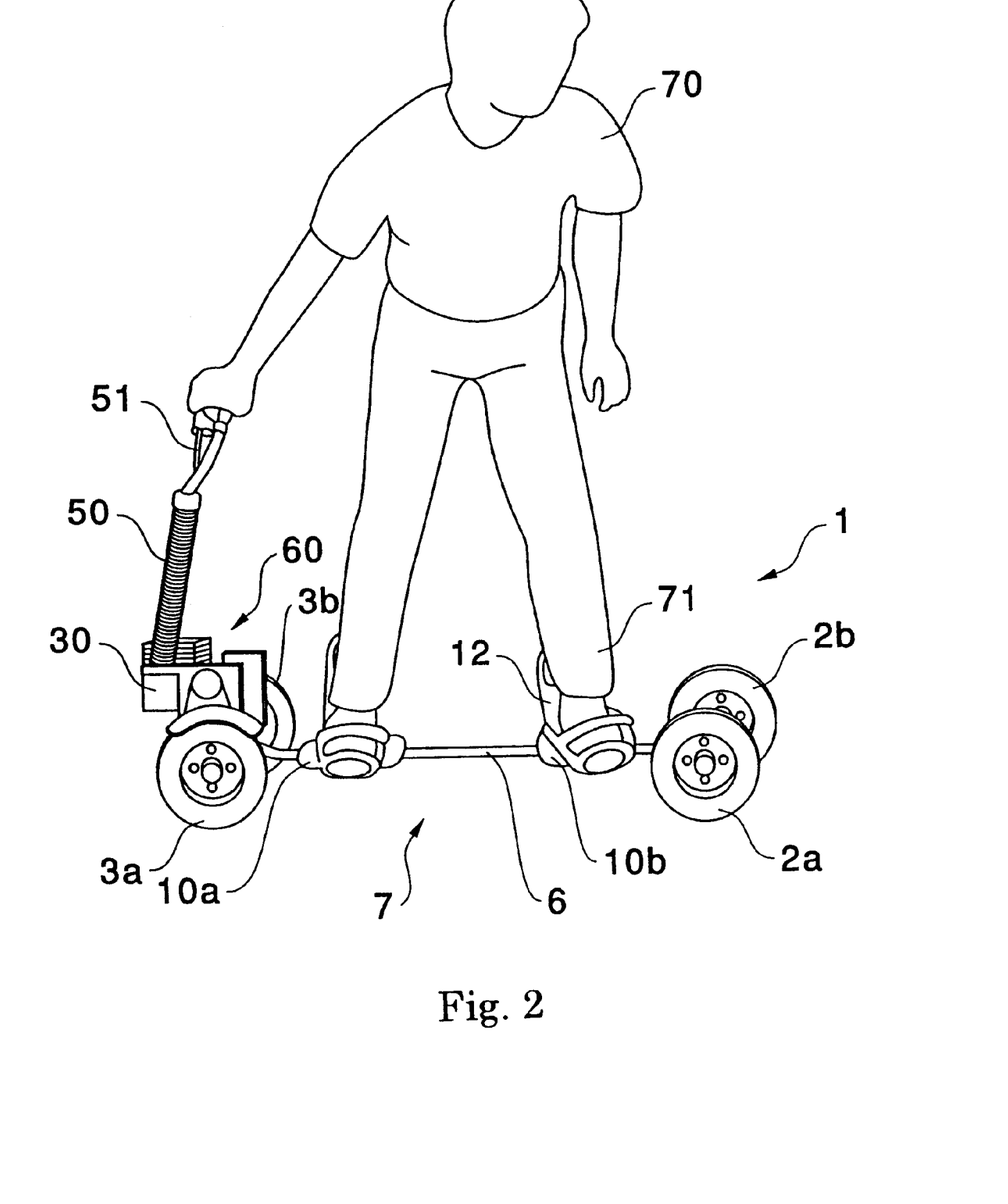
FIG. 2 is a perspective view of the transportation device shown in FIG. 1 on which the user rides.

FIG. 1 is a schematic view of a transportation device 1 according to this invention, and FIG. 2 shows how a user rides on the transportation device 1 shown in FIG. 1. The transportation device 1 has two pairs of wheels 2a and 2b, 3a and 3b placed in front and in rear, pipe-shaped frame shafts 4 and 5 joining these pairs of wheels respectively, and the pipe-shaped frame 6 joining the frame shafts 4 and 5. These two frame shafts 4 and 5, and the frame 6 are combined in approximately "H" shape to form a frame body 7. The rear wheels 3a and 3b, which are drive wheels, are protected by covers 80 and 81 respectively. And footboards (decks) 10a and 10b on which a user (rider) 70 can put his or her feet are attached to a main body 6a of the frame 6, and holders 12 which can hold the feet 71 of the user 70 are attached to the footboards 10a and 10b. As described, in the transportation device 1 of this example, the user 70 standing on the footboards 10a and 10b can adjust the load balance applied to the frame 6 and the frame shafts 4 and 5 by shifting user's weight right, left or in any other appropriate direction. Thus the user can change the course of the transportation device 1 as user likes.

The frame 6 is joined to the frame shafts 4 and 5 through joints 20a and 20b which move elastically so that the frame shafts 4 and 5 can rotate at an appropriate angle according to the shift of the user s weight. The joints 20a and 20b of this example which join the frame 6 to the frame shafts 4 and 5 have the same structure: springs 21 and dampers (shock absorbers) 22 are positioned on the right and left of the frame 6, and the frame shafts 4 and 5 and the frame 6 are joined through these springs and dampers. Accordingly, if the user riding on the frame 6 twists this frame 6 by shifting user's weight right or left, joined portions 6b and 6c of the frame 6 extending at an angle of almost 45 degrees rotate. Then, one of the springs 21 shortens while the other lengthens accordingly. According to the force of springs, the frame shafts 4 and 5 move to rotate with the loaded side (the side on which the user's weight is rested) inside, and thus the course of the frame body 7 can be controlled in a desired direction. Thus, the course of the transportation device 1 of this example can be changed by the shift of the user's weight as in the case of a skateboard and a snowboard. In addition, the reaction of the springs 21 caused by the shift of the user's weight can be prevented by the dampers 22, and the properties of these springs 21 and dampers 22 can be adjusted by means of bolts 25 used to attach the springs 21 and dampers 22.

A small gasoline engine 30 (power generator) having a displacement about 30 to 50 cc is supported on the rear frame shaft 5 of the transportation device 1 by a support board 31. The driving force of the engine 30 is transmitted to the right and left drive wheels 3a and 3b placed in the rear through a power transmission device 60 to enable the transportation device 1 to run. A supporting member 50 which can move flexibly by means of a flexible tube or coiled metal members and the like extends above the engine 30, and a control lever 51 is attached to the tip of the supporting member 50, which enables the user 70 to operate the engine 30 standing on the frame 6.

Figure 3:
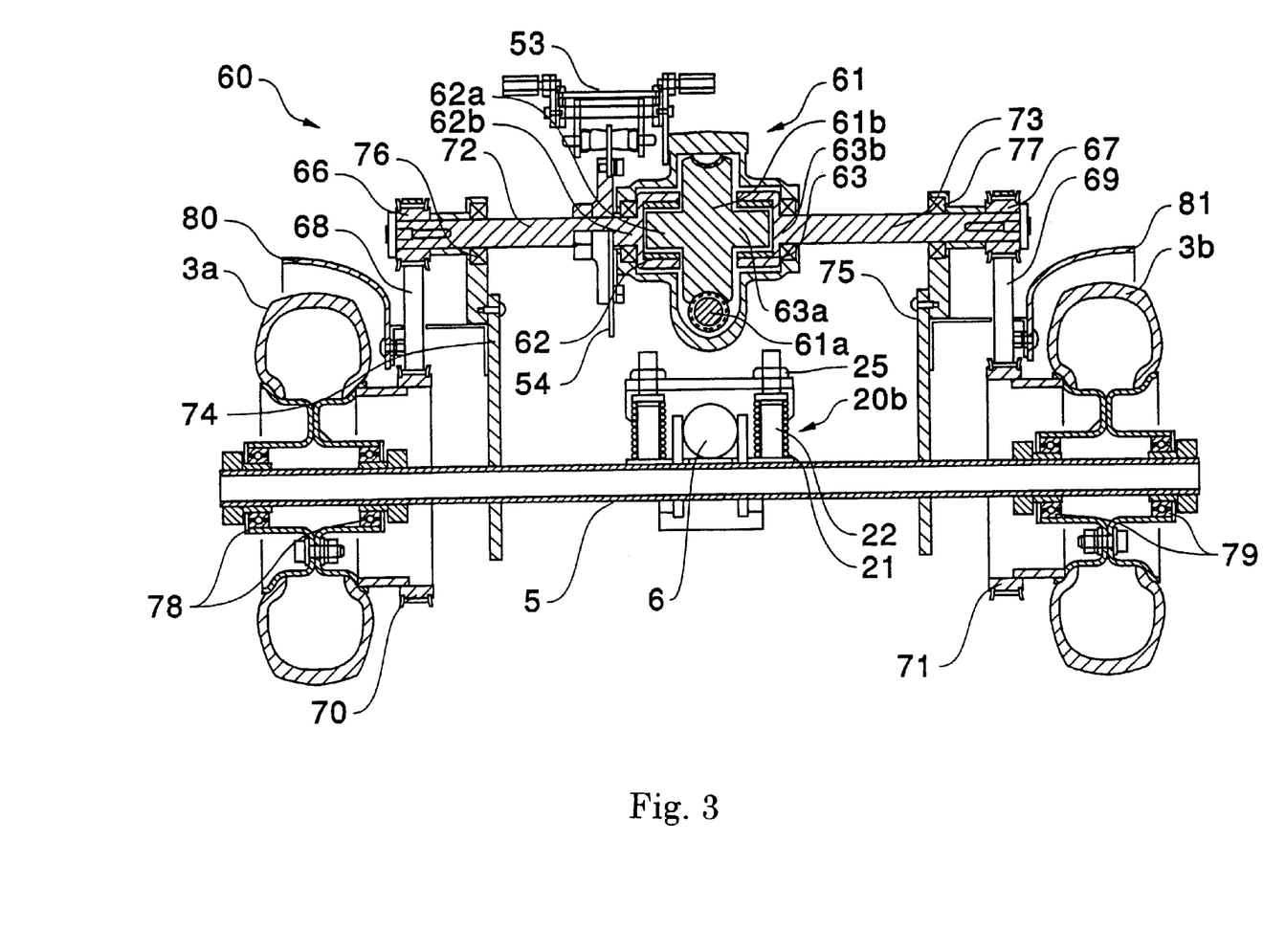
FIG. 3 is a sectional view of the power transmission device mounted on the transportation device shown in FIG. 1.
Figure 4:
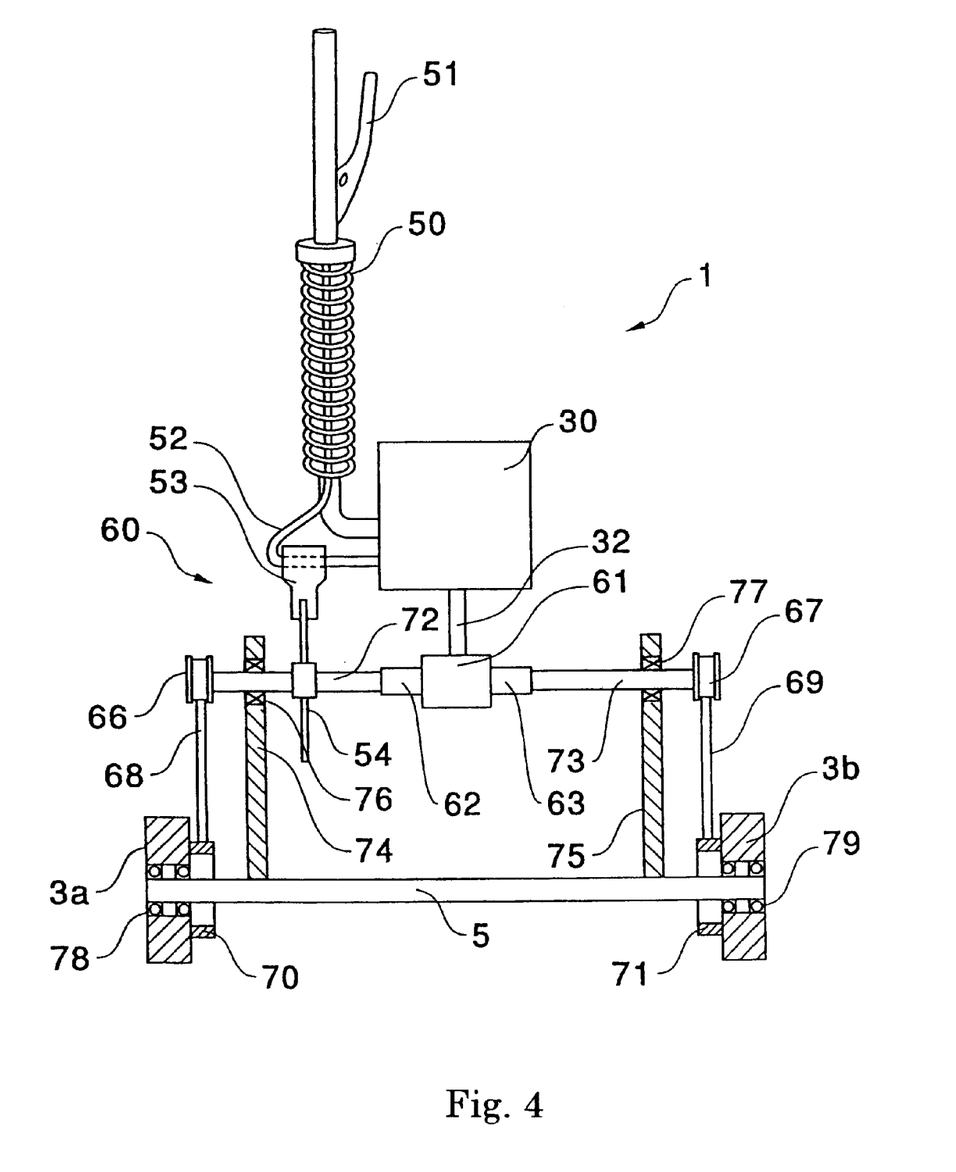
FIG. 4 is a block diagram of the power transmission device shown in FIG. 3.

FIG. 3 shows a schematic sectional configuration of the power transmission device 60 according to this invention fitted on the transportation device 1 of this embodiment. FIG. 4 schematically shows the configuration of the surroundings of the power transmission device 60 fitted on the transportation device 1. The power transmission device 60 can transmit the driving force of the engine 30 vertical to the frame shaft 5 along the frame 6 to the drive wheels 3a and 3b placed on both sides of the frame shaft 5. The power transmission device 60 comprises a worm gear 61, a first one-way clutch 62 and a second one-way clutch 63. The worm gear 61 turns the rotation direction of a drive shaft 32 of the engine 30 into the rotation direction of the drive wheels 3a and 3b. In the first one-way clutch 62, the driving side 62a of which is joined to the worm gearing 61, and the free traveling side 62b of which is joined to a drive shaft 72 which transmits power to the drive wheel 3a on the left side of the drawing. In the second one-way clutch 63, the driving side 63a of which is joined to the worm gearing 61, and the free traveling side 63b of which is joined to a drive shaft 73 which transmits power to the drive wheel 3b on the right side of the drawing. Thus the power transmission device 60 of this embodiment has the two one-way clutches 62 and 63 which can transmit the driving force of the engine (a power generator) 30 to the right and left drive wheels 3a and 3b respectively.

In the first and second one-way clutches 62 and 63, the driving sides 62a and 63a are combined with the free traveling sides 62b and 63b respectively so that the driving force will be transmitted without a slip in the direction in which the drive wheels 3a and 3b advance. Accordingly, the drive wheels 3a and 3b can rotate freely and the driving force of the engine 30 is not transmitted when the drive wheels 3a and 3b rotate backward, or when the free traveling sides 62b and 63b rotate faster than the driving sides 62a and 63a. Also, under these conditions, the rotational force from the drive wheels 3a and 3b are not transmitted to the engine 30.

The power transmission device 60 has a worm wheel 61b, which engages with a worm wheel 61a joined to the drive shaft 32 of the engine 30 and changes the power transmission direction by 90 degrees. And the worm wheel 61b, the driving sides 62a and 63a of the first and second one-way clutches 62 and 63 are integrated and rotate as one part. Accordingly, the worm gear 61 and the two one-way clutches 62 and 63 are housed extremely compactly, and thus the small and lightweight power transmission device 60 is realized. It is possible to design a power transmission device having the similar function of this embodiment by assembling independent parts used as the worm gearing 61, and the two one-way clutches 62 and 63.

In the power transmission device 60 of this embodiment, the right and left drive shafts 72 and 73 are arranged in parallel along the frame shaft 5, and are supported rotatably by the support plates 74 and 75 attached to the frame shaft 5 through bearings 76 and 77. Pulleys 66 and 67 are attached to the tips of the drive shafts 72 and 73 respectively, and are connected by means of drive belts 68 and 69 with passive pulleys 70 and 71 respectively of the right and left drive wheels 3a and 3b supported rotatably by the frame shaft 5 through bearings 78 and 79, and thus the driving force is transmitted. Because the transportation device 1 of this embodiment employs the configuration having the frames 4, 5 and 6 in order to steering by the shift of the rider's weight, the drive shafts 72 and 73 for transmitting the driving force are provided in addition to the frame shaft 5 that connects the wheels 3a and 3b. In a transportation device not employing such frame structure, drive shafts may be directly joined to the drive wheels 3a and 3b instead of frame shaft 5. It is also possible to transmit power by means of a gear train instead of a drive belt.

Furthermore, in the power transmission device 60, a disc brake 54, which is a brake device, is attached on the free traveling side 62b of the first one-way clutch 62, that is, on the side of the drive wheel 3a of the one-way clutch 62. And a control lever 51 through a control wire 52 can control a brake pad 53 of the disc brake 54. Since the free traveling side 62b of the one-way clutch 62 is joined to the drive wheel 3a through the drive shaft 72 and the belt 68, it is possible to brake the drive wheel 3a by means of the disc brake 54. The disc brake 54 of this embodiment works to stop the wheel when the control lever 51 is free, and when the control lever 51 is held, the disc brake 54 is released to enable the drive wheel 3a to rotate.

In the transportation device 1 of this embodiment, it is possible to control a throttle of the engine 30 by means of the control wire 52 extending from the control lever 51. When the control lever 51 is not held, the output of the engine 30 is small, and the rotational force is not transmitted to the power transmission device 60 by a centrifugal clutch disposed in the block of the engine 30. Also, because the control lever 51 is not held, the brake is working. While when the control lever 51 is held, the output of the engine 30 increases and the rotating speed increases accordingly. Then the power is transmitted to the power transmission device 60 through the centrifugal clutch, and the brake is released, thereby the transportation device 1 starts. In the transportation device 1, it is possible to control the main components such as brake and engine by means of the control lever 51. Therefore, it is possible to gather the control mechanism of the drive system, such as brake, transmission and engine disposing the brake on the power transmission device 60 which is to be placed close to the engine 30. Therefore, the transportation device 1 having drive and control systems can be arranged extremely simple and smart. For example, instead of providing a disc brake for each wheel, it is possible to place the disc brake 54 close to the engine 30 as shown above. Thus the control mechanism can be simplified, and the driving performance can be improved because the structure around the wheels can be simplified and the transportation device becomes lightweight.

In the transportation device 1, the driving force to the front of the engine 30 is transmitted without a slip to the drive wheels 3a and 3b through the one-way clutches 62 and 63 respectively. Therefore, the engine power is transmitted to the drive wheels 3a and 3b almost half-and-half, when the transportation device 1 moves straight on a near the plane condition. Because, the wheel contact load of the drive wheels 3a and 3b are almost the same and the number of revolutions of the drive wheels 3a and 3b are almost the same, the forwarding drive force is transmitted almost uniformly to the both drive wheels 3a and 3b. Thus, the load of each drive wheels 3a and 3b for moving is decreased. And the power can be transmitted to the ground without fail, and the transportation device can be started or accelerated smoothly.

Figure 5:
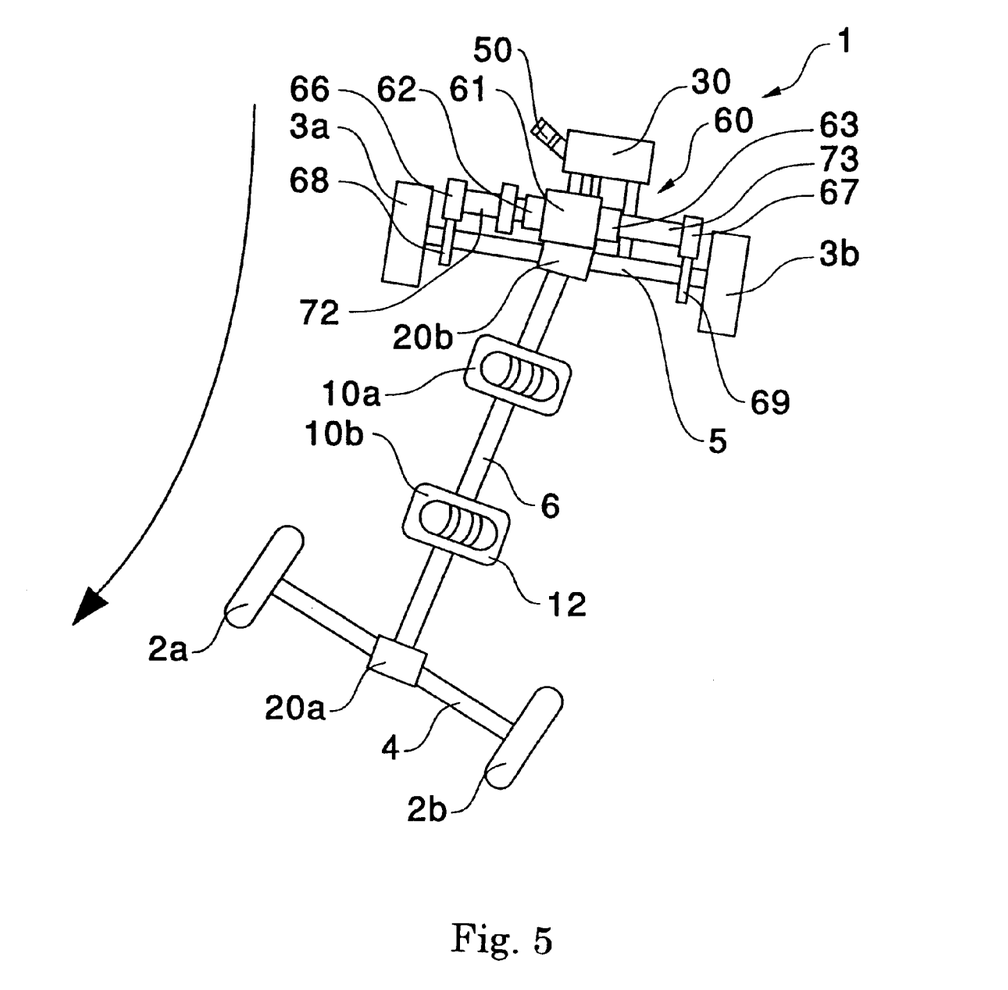
FIG. 5 is a schematic view of the transportation device shown in FIG. 1 while turning.

On the other hand, it is possible to concentrate the engine power on either the drive wheel 3a or the drive wheel 3b when the transportation equipment 1 is steering, moving on a rough condition and the like. When the transportation device 1 turns, the engine power can be mainly transmitted to the desired drive wheel 3a or 3b located inside by the transmission device 60 of this invention, therefore the transportation device 1 turns smoothly. With reference to FIG. 5, the functioning of the power transmission device 60 will be explained more precisely when the transportation device 1 turns. The rider 70 shifts rider's weight toward the right as rider's proceeds (the left in the drawing) while the transportation device 1 is moving. The frame shafts 4 and 5 move in such a way that the distance between the wheels 2a and 3a which come inside is smaller than that between the wheels 2b and 3b which come outside. The transportation device 1 turns right as it proceeds. Since the outside drive wheel 3b travels a longer distance than the inside drive wheel 3a, the outside drive wheel 3b rotates faster than the inside drive wheel 3a. Therefore in the second one-way clutch 63, the free traveling side 63b rotates faster than the driving side 63a and becomes free, and hardly any driving force is transmitted to the drive wheel 3b. While the inside drive wheel 3a rotates more slowly, and the driving force is supplied from the driving side 62a to the free traveling side 62b. As a result, the transportation device 1 can turn with the right and left drive wheels 3a and 3b rotating at a different speed, and the turning (steering) performance thereof is improved. Even when the outside drive wheel 3b becomes free of power, most of the driving force is supplied to the inside drive wheel 3a; therefore the stable or continuous driving force can be obtained during turns. When the transportation device 1 turns in an opposite direction, the one-way clutches 62 and 63 function the other way but the same manner. In this case, also the rider can turn the transportation device smoothly and powerfully as rider's likes.

During a curve or on a rough ground, either the drive wheel 3a or 3b may part from the ground. Especially, when the transportation device 1 runs in a rough place such as a wasteland, either the drive wheel 3a or 3b will part from the ground or loss the contact by slip. However, as described above, according to the transmission device of this invention, when the ground contacting of either the drive wheel 3a or 3b is worsen or lost, the engine power will concentrated on the other drive wheel still contacting the ground. Namely, in the one-way clutch 62 or 63 of the transmission device 60, for example, contact load of the drive wheel whose wheel 3a is decreased or lost, the free traveling side 62b rotates faster than the driving side 62a. Accordingly, the power is not transmitted to the drive wheel 3a, and the driving force is transmitted mainly to the drive wheel 3b that touches the ground. Thus, the transportation equipment 1 having the power transmission device 60 can drive powerfully during go straight, turns, on the rough places and under the other conditions. Because even if the driving conditions worsen and the wheel contact load of either the drive wheel 3a or 3b decrease, the other drive wheel provides stable and/or continuous driving force. In addition, since the engine power is continuously supplied to either the drive wheel 3a or 3b, it is possible to prevent the engine 30 becomes over speed under a no load condition.

As was described above, the power transmission device 60 of this embodiment has an excellent property that it can automatically adjust the power supply to the right and left drive wheels 3a and 3b according to the difference in the number of revolutions of the drive wheels 3a and 3b, the ground contacting condition of each of the wheels, and the like. Furthermore, the power transmission device 60 realizes this property by adopting an extremely simple configuration with the two one-way clutches 62 and 63 transmitting the power to the drive wheels 3a and 3b respectively. Accordingly, the power transmission device 60 having this excellent property can be designed and made compact and lightweight, and can be provided at a low cost. And this power transmission device 60 is a highly reliable mechanism because it has a simple configuration.

Accordingly, by employing the power transmission device 60, it is possible to realize low-cost, lightweight and simple-structured transportation device 1 having high turning or steering performance which can run in a rough place, wasteland and the like.

The transportation equipment 1 of this embodiment has more merit. Since both of the right and left drive wheels 3a and 3b are joined to the engine 30 through the one-way clutches 62 and 63 in the power transmission device 1, it is also possible to run the transportation device 1 by the inertia force. For example, when the transportation device runs down a slope, or is drawn, the drive wheels 3a and 3b can rotate with both of the one-way clutches 62 and 63 free; thus the rider can enjoy running differently from when using the engine 30. In addition, since the power transmission device 60 has the disc brake 54, the rider can control the speed freely and can enjoy running the transportation device safely.

Although the gasoline engine (internal combustion engine) 30 is used in the transportation device 1 in the above explanation, this invention can be applied to other kinds of transportation equipment such as having a motor with batteries and others. Although the engine 30 is vertical installed to the driving shaft in the above embodiment, the engine or power generator may be installed parallel to the driving shaft. In this design, a worm gearing or a bevel gear and the like changing the direction of rotation are unnecessary; therefore it is possible to join the engine to the one-way clutches through a relatively simple gear train or directly.

Although the disc brake 54 is attached only on the side of the drive wheel 3a of the first one-way clutch 62 in the above explanation, the disc brake may be attached on the side of the drive wheel 3b of the second one-way clutch 63, or on both sides. While the transportation device of this embodiment is two-wheel drive, the power transmission device according to this invention can be employed in a transportation device having four or more drive wheels. It is desirable that in a transportation device having three or more drive wheels, each drive wheel be provided with a one-way clutch because the driving conditions of each drive wheel changes individually. It is possible to divide a plurality of drive wheels into groups and to provide each group with a one-way clutch, or to combine a one-way clutch provided to an individual wheel and a one-way clutch provided to a group.

The transportation device of this invention is explained by that employs the frame body 7 made of the pipe-shaped frame shafts 4 and 5, and the frame 6. It goes without saying that the power transmission device according to this invention is not limited the above frame type equipment but the other various type of equipment are included in this invention, such as a transportation device having an engine is mounted on a skateboard whose frame body is mainly composed of a plate member, a transportation device having a seat or seats, a transportation device for a plurality of persons, and the like. The power transmission device of this invention is one of the best transmission devices for a transportation device which a user can steer by shifting weight. But, the power transmission device of this invention may be applied the moving equipment which a user can steer by handlebar and the like.

As was described above, in the power transmission device according to this invention, at least two one-way clutches are used to transmit the driving force of the power generator to the right and left drive wheels. By employing this power transmission device, it is possible to transmit the driving force of the power generator to the right and left drive wheels almost half and half when the wheel contact load of the two drive wheels are the same. While if the drive wheels rotate at a different speed, hardly any driving force is transmitted to the side of the drive wheel which can rotate faster because the one-way clutch on that side becomes free. Therefore, the driving force is transmitted to the side of the drive wheel which will rotate more slowly through the one-way clutch. Accordingly, it is possible to transmit the power without fail to the drive wheel which touches the ground even when the transportation device is curving or slipping, or when one of the wheels parts from the ground. Thus the stable and/or continuous driving force can be obtained under any driving conditions.

In sum, according to this invention, it is possible to provide the compact and lightweight power transmission device having a simple configuration which can be manufactured at a low cost, and which can automatically adjust the driving force supply to the drive wheels depending on the ground contacting of the drive wheels, and the like. And by adopting the power transmission device according to this invention, it is possible to provide the transportation device having high turning performance and power performance which can run smoothly in a rough place, wasteland and the like.

What is claimed is:

1. A transportation device, comprising:
   a power generator;
   a frame on which a rider rides;
   a plurality of wheels which support the frame, the wheels including right and left drive wheels;
   a drive shaft assembly for transmitting power from the power generator to the right and left drive wheels;
   first and second one way clutches located at a position on the drive shaft assembly where power from the power generator is transferred to the drive shaft assembly, the first one-way clutch transmits power to the left drive wheel and the second one way clutch transmits power to the right drive wheel;
   means for connecting the frame to the drive shaft assembly such that an angle between the frame and the drive shaft assembly changes as the transportation device turns; and
   wherein the frame includes a bend at an end thereof adjacent the drive shaft assembly and the bend causes the angle to change as the transportation device turns.

2. The transportation device of claim 1, wherein the drive shaft assembly includes a right drive shaft connected to the right drive wheel and a left drive shaft connected to the left drive wheel.

3. The transportation device of claim 2, further comprising a power transmission device located between the left drive shaft and the right drive shaft, wherein power from the power generator is transferred to the power transmission device, and wherein power from the power transmission device is transferred to the left drive shaft via the first one way clutch and power from the power transmission device is transferred to the right drive shaft via the second one way clutch.

4. The transportation device of claim 1, wherein the position is at an axial center part of the transportation device.

5. The transportation device of claim 3, wherein the position is at an axial center part of the transportation device.

6. The transportation device of claim 1, wherein a direction of travel of the transportation device is controlled by a weight shift of the rider.

7. The transportation device of claim 1, further comprising a brake located at a wheel side of one of the one way clutches.

* * * * *